(12) United States Patent
Kume et al.

(10) Patent No.: US 8,770,312 B2
(45) Date of Patent: Jul. 8, 2014

(54) CAM DRIVING DEVICE AND PROCESSING METHOD

(75) Inventors: Masao Kume, Tochigi (JP); Keisuke Takahashi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 503 days.

(21) Appl. No.: 12/780,397

(22) Filed: May 14, 2010

(65) Prior Publication Data

US 2010/0300713 A1    Dec. 2, 2010

(30) Foreign Application Priority Data

May 15, 2009    (JP) .................................. 2009-118756

(51) Int. Cl.
*B23Q 5/00* (2006.01)

(52) U.S. Cl.
USPC ............................................................. 173/4

(58) Field of Classification Search
USPC .................. 173/4, 10, 13, 39, 45, 141, 213; 82/1.2–1.4, 131; 408/173, 174, 178, 408/153
IPC ..................................................... B23B 22/26
See application file for complete search history.

(56) References Cited

U.S. PATENT DOCUMENTS

| | | | | |
|---|---|---|---|---|
| 2,820,376 A | * | 1/1958 | Jannenga et al. ................ 82/1.2 |
| 3,443,458 A | * | 5/1969 | Ohrnberger et al. ............. 82/1.2 |
| 3,795,160 A | * | 3/1974 | Janiszewski ....................... 82/1.4 |
| 3,949,643 A | * | 4/1976 | Mucci et al. .................. 409/288 |
| 4,066,380 A | * | 1/1978 | Beck et al. ..................... 408/125 |
| 4,432,258 A | * | 2/1984 | Currer ............................... 82/1.2 |
| 4,573,379 A | * | 3/1986 | Bald ................................ 82/145 |
| RE32,211 E | * | 7/1986 | Jerue et al. ....................... 82/1.2 |
| 4,612,831 A | * | 9/1986 | Lehmkuhl ........................ 82/1.4 |
| 4,750,392 A | * | 6/1988 | Hong ............................... 82/158 |
| 4,751,970 A | * | 6/1988 | Hecker et al. ................. 173/104 |
| 4,979,852 A | * | 12/1990 | Noggle ......................... 408/156 |

(Continued)

FOREIGN PATENT DOCUMENTS

DE    4125106 A1 *  2/1993    ............ B23B 29/034
DE    4401496 A1 *  8/1995

(Continued)

OTHER PUBLICATIONS

Chinese Office Action from the State Intellectual Property Office of China, Application No. 201010180466.6, Applicant—Honda Motor Co. Ltd., Issued Mar. 20, 2012, six pages.

*Primary Examiner* — Robert Long
(74) *Attorney, Agent, or Firm* — Rankin, Hill & Clark LLP

(57) ABSTRACT

A cam driving device for a processing device including a cylindrical member, a rotational shaft that has a mount hole formed on the outer peripheral surface thereof, a cam, and a tool that is mounted in the mount hole of the cylindrical member so that the tool can be protruded and retracted through the mount hole in a radial direction of the rotational shaft in accordance with a profile of the cam. The cylindrical member and the rotational shaft are axially reciprocated to process a non-circular bore, including a storage unit for storing a data table representing associating relationship between a rotational angle of the cam and a protrusion amount of the tool which is provided on the basis of the rotational angle of the cam, and a controller for advancing or retarding the rotational angle of the rotational shaft according to the data table stored in the storage unit.

7 Claims, 15 Drawing Sheets

(56) References Cited

U.S. PATENT DOCUMENTS

| | | | |
|---|---|---|---|
| 5,141,434 A * | 8/1992 | Slaski | 433/165 |
| 5,256,004 A * | 10/1993 | Gemmi et al. | 405/237 |
| 5,309,800 A * | 5/1994 | Yuhara | 82/18 |
| 5,626,474 A * | 5/1997 | Kukla et al. | 433/141 |
| 5,653,560 A * | 8/1997 | Weber et al. | 408/1 R |
| 5,704,436 A * | 1/1998 | Smith et al. | 175/27 |
| 5,713,253 A * | 2/1998 | Date et al. | 82/1.11 |
| 5,820,311 A * | 10/1998 | Grun et al. | 407/102 |
| 5,833,524 A * | 11/1998 | Satoh et al. | 451/456 |
| 5,850,769 A * | 12/1998 | Lund | 82/1.3 |
| 5,971,678 A * | 10/1999 | Linderholm | 409/132 |
| 6,179,529 B1 * | 1/2001 | McClure et al. | 408/62 |
| 6,227,082 B1 * | 5/2001 | Hormansdorfer et al. | 82/1.11 |
| 6,315,503 B1 * | 11/2001 | Oswald et al. | 408/1 R |
| 6,330,503 B1 * | 12/2001 | Sharp et al. | 701/50 |
| 6,343,899 B1 | 2/2002 | Straub et al. | |
| 6,565,298 B2 * | 5/2003 | Ishida et al. | 409/200 |
| 6,655,883 B2 * | 12/2003 | Maar | 408/158 |
| 6,705,184 B2 * | 3/2004 | Cardemon et al. | 82/1.11 |
| 7,172,034 B2 * | 2/2007 | Makiyama et al. | 173/1 |
| 7,264,430 B2 * | 9/2007 | Bischof et al. | 409/231 |
| 7,272,877 B2 * | 9/2007 | Cardemon et al. | 29/26 A |
| 7,350,593 B1 * | 4/2008 | Brookover | 175/27 |
| 2001/0015115 A1 * | 8/2001 | Hoermansdoerfer | 82/1.3 |
| 2001/0052418 A1 * | 12/2001 | Wissmach et al. | 173/170 |
| 2003/0061919 A1 * | 4/2003 | Antoni et al. | 82/56 |
| 2004/0144566 A1 * | 7/2004 | Fisher | 175/55 |
| 2005/0159840 A1 * | 7/2005 | Lin et al. | 700/245 |
| 2007/0276391 A1 * | 11/2007 | Graves et al. | 606/80 |
| 2009/0028652 A1 * | 1/2009 | Yamamoto | 408/6 |
| 2009/0129879 A1 * | 5/2009 | Sadaoka et al. | 408/1 R |
| 2010/0263494 A1 * | 10/2010 | Badiali | 81/57 |
| 2011/0023667 A1 * | 2/2011 | Kume et al. | 82/1.3 |
| 2011/0209888 A1 * | 9/2011 | Elsworthy | 173/217 |

FOREIGN PATENT DOCUMENTS

| | | | |
|---|---|---|---|
| DE | 4401496 C2 | 9/1996 | |
| DE | 10126969 A1 | 1/2003 | |
| DE | 19711317 C2 | 3/2003 | |
| DE | 112007000560 T5 | 1/2009 | |
| GB | 2077152 A * | 12/1981 | B23B 1/06 |
| JP | 2007-313619 | 12/2007 | |
| JP | 2009248292 A * | 10/2009 | |
| JP | 2010264565 A * | 11/2010 | |
| WO | WO 2007119334 A1 * | 10/2007 | |
| WO | 2009/125638 | 10/2009 | |
| WO | WO 2009125638 A1 * | 10/2009 | |

* cited by examiner

FIG. 2A
FIG. 2B
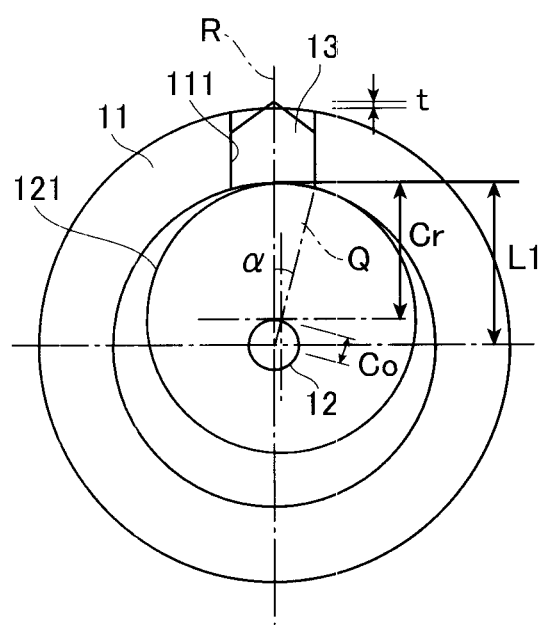
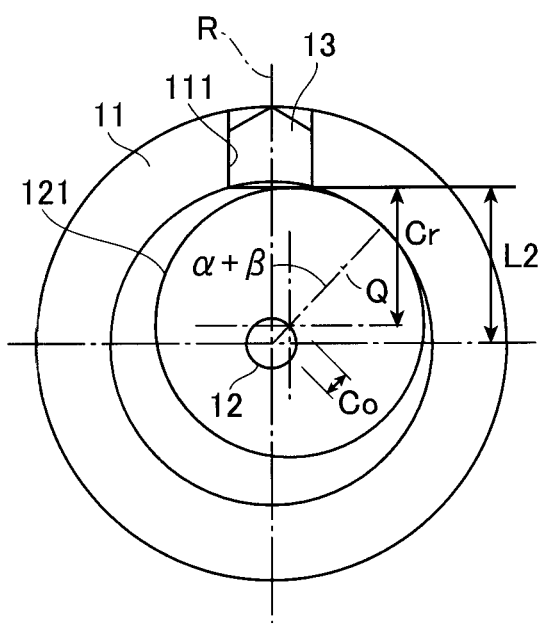

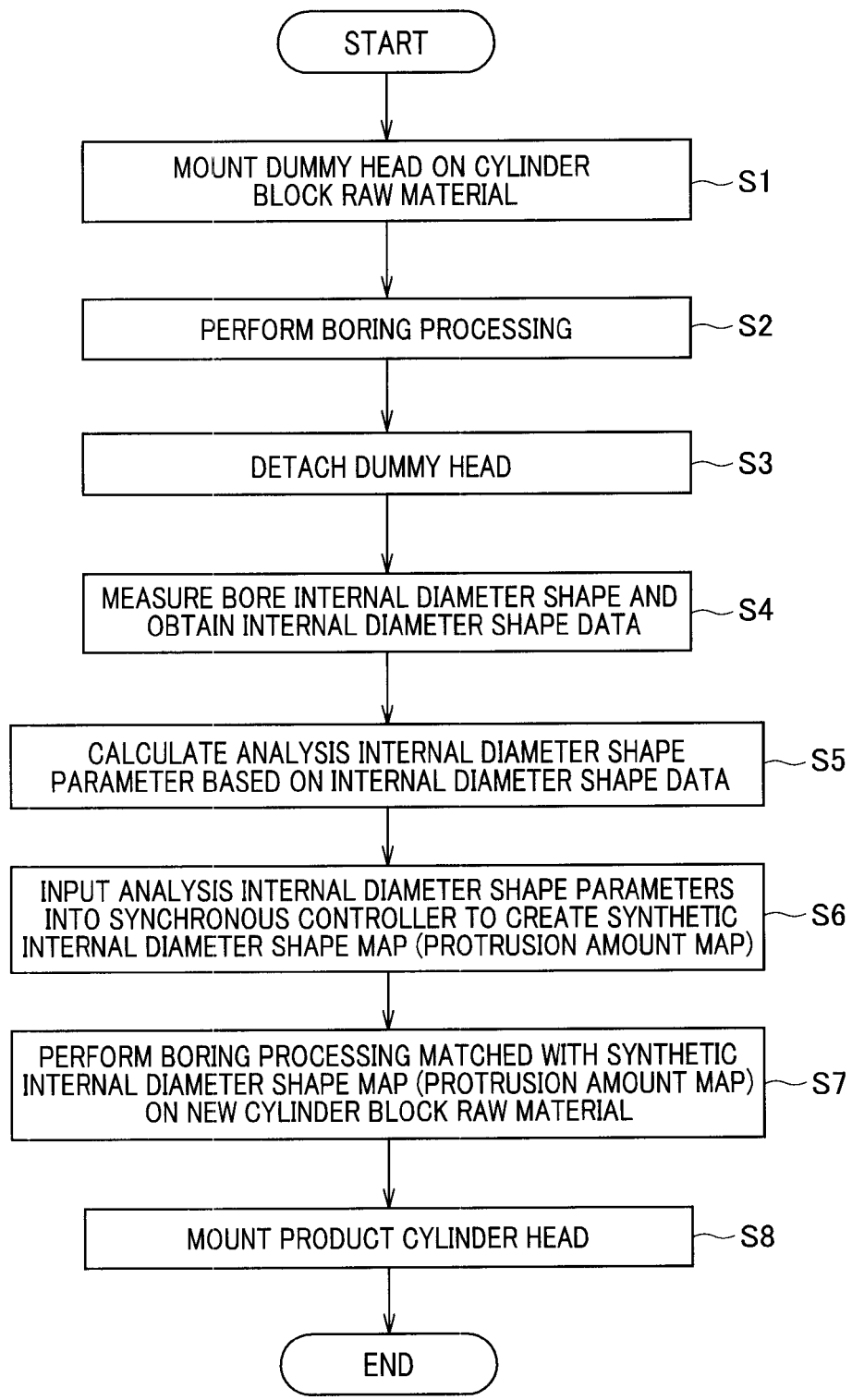

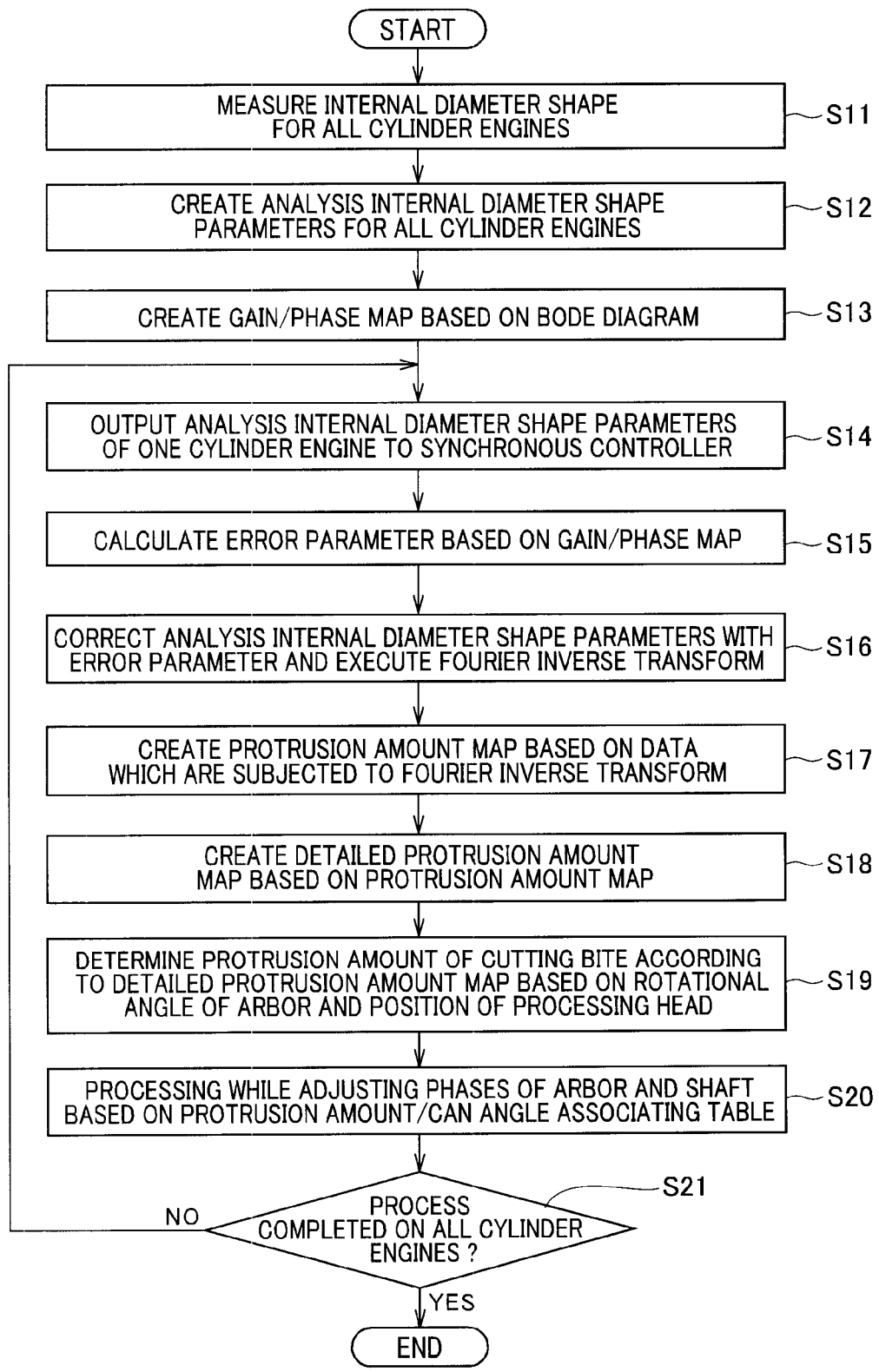

ROTATIONAL ANGLE

ROTATIONAL ANGLE

CAM DRIVING DEVICE AND PROCESSING METHOD

INCORPORATION BY REFERENCE

The present application claims priority under 35 U.S.C. §119 to Japanese Patent Application No. 2009-118756 filed on May 15, 2009. The content of the application is incorporated herein by reference in its entirety.

BACKGROUND OF THE INVENTION

1. Field of the Invention

The present invention relates to a cam driving device and a processing method, and particularly to a cam driving device and a processing method that are suitably used for a processing apparatus for processing the inner peripheral surface of a non-circular bore.

2. Description of the Related Art

It has been general in a manufacturing process of vehicles that a bore of a cylinder block of an engine is formed by a cutting work and then a cylinder head, a crank case, etc. are installed in the cylinder block. Furthermore, a piston is also mounted in the bore. When an actual engine is driven, fuel in the engine is combusted, and the piston is heated by combustion gas and expands. At this time, the shape of the piston approaches to a perfectly circular shape in section, and thus the piston has a substantially perfectly circular cross-section. Therefore, when the piston is installed in the bore of the cylinder block, the piston has an oval shape in which the major axis is slightly longer than the minor axis. In some cases, it is desired that the cross-sectional shape of the bore is a desired elliptical shape having an outward fixed clearance with respect to the outline of the cross-section of the piston. Therefore, it is desired to perform the cutting work so that the cross-sectional shape of the bore approaches to such a state that a fixed range of clearance is formed between the cross-section of the bore and the piston, and it is also desired that the bore has a substantially perfectly circular cross-section when the engine is driven after the engine is assembled.

It has been hitherto difficult to process bores in a non-circular shape containing a desired elliptic shape at high speed, and thus bores have been hitherto processed in a substantially perfectly circular shape. Even when the bore of a cylinder block is processed to have a desired elliptical cross-section, the shape of the bore is deformed when a cylinder head, a crank case, etc. are assembled to the cylinder block. When the bore is deformed as described above, it increases the sliding resistance between the bore and the piston when the engine is used, and thus there is a risk that the engine cannot exercise desired performance.

Therefore, in the process of processing the bore of the cylinder block, the bore processing is executed while a dummy head imitating the cylinder head is attached, and when the bore processing is finished, the dummy head is detached. However, when the attaching and detaching work of the dummy head, etc. is executed every time the processing of the bore of the cylinder block is executed, the productivity is greatly reduced.

In order to solve this problem, the following method has been proposed (see JP-A-2007-313619). That is, a dummy head is mounted in the cylinder block, and a bore is processed to have a non-circular shape containing a desired elliptic shape in cross-section or an ideal circular shape containing a substantially perfectly circular shape in cross-section. Subsequently, the dummy head is detached from the cylinder block. At this time, stress caused by the mounting of the dummy head is released, and thus the shape of the bore is deformed and becomes a non-circular shape in cross-section. The overall shape of the bore having the non-circular cross-section is measured to generate NC data. Specifically, measurement points are set at predetermined intervals along the axial line of the bore which has been deformed to have a non-circular cross-section due to the detachment of the dummy head, and the cross-sectional shape of the bore at each measurement point is measured, thereby generating the NC data described above.

Thereafter, boring processing is executed on a non-processed cylinder block on the basis of the generated NC data without mounting any dummy head to form a non-circular bore. According to this method, even in a case where the bore is processed without securing the dummy head to the cylinder block, the bore has a three-dimensional shape having a desired ideal elliptical cross-section when the cylinder is mounted.

However, the deformation amount of the bore when the dummy head is detached from the cylinder block is not necessarily uniform, and thus the cross-sectional shapes of the bore at the respective measurement points are different from one another. Accordingly, in order to form a non-circular bore in the cylinder block, it is necessary to execute the cutting work corresponding to the cross-sectional shape at each of the measurement points along the axial line. The cutting work is executed while a cutting tool is projected to the inner peripheral surface of the bore. In order to process the bore so that the bore have different cross-sectional shapes at the respective measurement points, the projection amount of the cutting tool at each measurement point is required to be accurately set. When the control of the projection amount is not accurate, the cross-section of the bore does not have a desired ideal elliptical shape when the cylinder head is assembled to the cylinder block, and this causes increase of the sliding resistance between the bore and the piston when the engine is used.

SUMMARY OF THE INVENTION

The present invention has been implemented in view of the foregoing problem, and has an object to provide a cam driving device and a processing method with which the inner peripheral surface of a non-circular bore can be processed with high precision.

In order to attain the above object, according to a first aspect of the present invention, there is provided a cam driving device for a processing device including a cylindrical member (25), a rotational shaft (11, 12) that is provided in the cylindrical member and has a mount hole (111) formed on the outer peripheral surface thereof, a cam (121) provided to the rotational shaft, and a tool (13) that is mounted in the mount hole of the cylindrical member so that the tool can be protruded and retracted through the mount hole in a radial direction of the rotational shaft in accordance with a profile of the cam, the cylindrical member and the rotational shaft being axially reciprocated to process a non-circular bore, characterized by comprising: a storage unit (91) for storing a data table (90) representing associating relationship between a rotational angle of the cam and a protrusion amount of the tool which is provided on the basis of the rotational angle of the cam; and a controller (41) for advancing or retarding the rotational angle of the rotational shaft with respect to the cylindrical member according to the data table stored in the storage unit.

According to the cam driving device, the cam is used as a mechanism of protruding the tool, and thus the construction can be facilitated. In addition, the data (data table) associating the rotational angle of the cam and the protrusion amount of the tool obtained on the basis of the rotational angle with each other is stored, and the rotational shaft is advanced or retarded in rotational angle with respect to the cylindrical member according to the data (data table) concerned. Therefore, the protrusion amount of the tool provided in the mount hole can be properly adjusted while the cam having any cam profile is used. Accordingly, the non-circular bore can be processed with high precision.

Furthermore, in the above cam driving device, the rotational shaft comprises a first rotational shaft (11) and a second rotational shaft (12) provided in the first rotational shaft, the mount hole is formed on the outer periphery of the first rotational shaft, the cam is provided to the second rotational shaft, and the controller advances or retards the phase of the rotational angle of the second rotational shaft with respect to the phase of the rotational angle of the first rotational shaft according to the data table stored in the storage unit.

According to the cam driving device, the cam is used as a mechanism of protruding the tool, and thus the construction can be facilitated. In addition, the data (data table) associating the rotational angle of the cam and the protrusion amount of the tool obtained on the basis of the rotational angle with each other is stored, and the phase of the second rotational shaft is advanced or retarded with respect to the phase of the first rotational shaft according to the data (data table) concerned. Therefore, the protrusion amount of the tool provided in the mount hole can be properly adjusted while the cam having any cam profile is used. Accordingly, the non-circular bore can be processed with high precision.

The above cam driving device further may comprises a first rotation detecting unit (252) for detecting a rotational speed of the first rotational shaft, and a second rotation detecting unit (241) for detecting a rotational speed of the second rotational shaft, wherein the first and second rotational shafts are synchronized with each other in rotational speed, the rotational speed of the first rotational shaft is multiplied by the resolution of the second rotation detecting unit to obtain a first multiplication value, the rotational speed of the second rotational shaft is multiplied by the resolution of the first rotation detecting unit to obtain a second multiplication value, a speed error is calculated from the difference between both the first and second multiplication values, and the calculated speed error is added to an instruction value of the rotational speed of the first or second rotational shaft to control the rotation.

According to the cam driving device, even when the resolution of the first rotation detecting unit is different from the resolution of the second rotation detecting unit, these resolutions can be matched with each other in consideration of the resolution ratio. The speed error is calculated on the basis of the difference between the rotational speeds of the first and second rotational shafts whose resolutions are matched with each other, whereby the speed error between the first and second rotational shafts can be accurately determined, and both the rotational shafts can be accurately synchronized with each other.

In the above cam driving device, the cam may be designed in a perfectly circular shape. According to this construction, the manufacturing cost of the cam can be suppressed.

According to a second aspect of the present invention, there is provided a method of processing a non-circular bore in a processing device including a first rotational shaft (11) having a mount hole (13) on the outer periphery thereof, a second rotational shaft (12) provided in the first rotational shaft, a cam (121) provided to the second rotational shaft, and a tool (13) mounted in the mount hole of the cylindrical member, comprising: protruding and retracting the tool through the mount hole in a radial direction of the first rotational shaft in accordance with a profile of the cam while the first and second rotational shafts are axially reciprocated; and advancing or retarding the phase of the rotational angle of the second rotational shaft with respect to the phase of the rotational angle of the first rotational shaft according to a data table (90) representing associating relationship between a rotational angle of the cam and a protrusion amount of the tool provided on the basis of the rotational angle of the cam.

This processing method has the same effect as the cam driving device of this invention. That is, the cam is used as a mechanism of protruding the tool, and thus the construction can be facilitated. In addition, the data (data table) associating the rotational angle of the cam and the protrusion amount of the tool obtained on the basis of the rotational angle with each other is stored, and the rotational shaft is advanced or retarded in rotational angle with respect to the cylindrical member according to the data (data table) concerned. Therefore, the protrusion amount of the tool provided in the mount hole can be properly adjusted while the cam having any cam profile is used. Accordingly, the non-circular bore can be processed with high precision.

In the above processing method, the non-circular bore may be processed on the basis of processing information for controlling the processing device when the tool is protruded from the mount hole to process the non-circular hole, and the processing information may be created on the basis of shape data obtained on the basis of a simulation in which under a condition that an assembly member is assembled to an assembly target member having a bore having a desired ideal cross-sectional shape, it is simulated how the bore is deformed and thus what shape the bore has after the assembly in a virtual space on a computer in a CAE system.

According to this processing method, the shape data of the bore which has a desired ideal cross-sectional shape when the assembly member is assembled to the assembly target member can be obtained through the simulation with neither actually processing the bore having the desired ideal cross-sectional shape in the assembly target member to which the assembly member is assembled, nor measuring the shape of the bore after the assembly member is detached.

BRIEF DESCRIPTION OF THE DRAWINGS

FIGS. 2A-2B are schematic diagrams showing a projection amount of a cam of the non-circular bore processing device according to the embodiment;

FIG. 5 is a flowchart showing the procedure of executing boring processing on a bore of a cylinder block by using the non-circular bore processing device according to the embodiment;

FIG. 8 is a flowchart showing a detailed procedure from measurement of the internal shape of a bore till boring processing in the non-circular bore processing device according to the embodiment;

DETAILED DESCRIPTION OF THE EMBODIMENT

An embodiment according to the present invention will be described with reference to the accompanying drawings.

Figure 1:
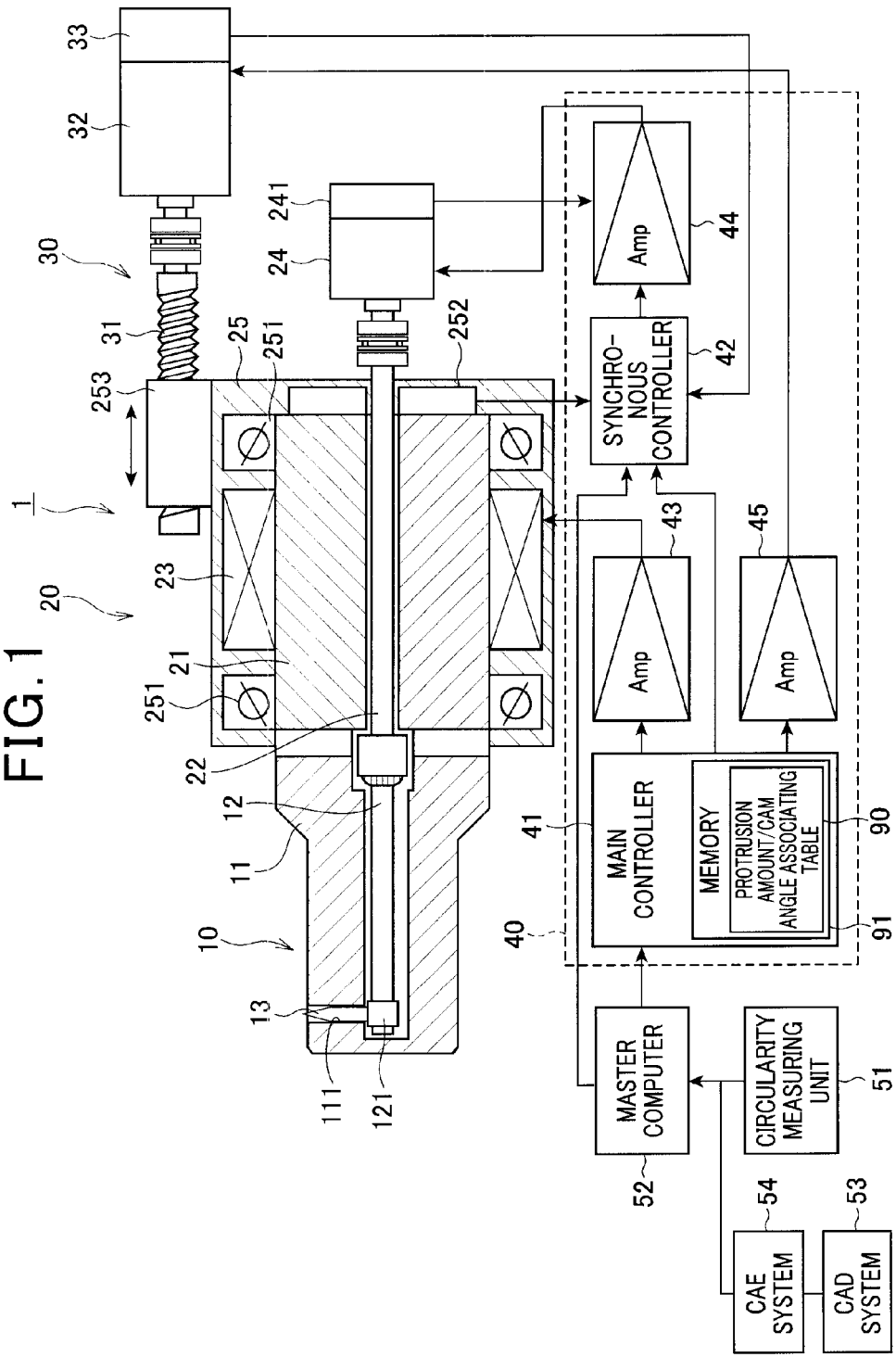
FIG. 1 is a diagram showing the construction of a non-circular bore processing device according to an embodiment of the present invention.

FIG. 1 is a diagram showing the construction of a non-circular bore processing device 1 according to an embodiment of the preset invention.

The non-circular bore processing device 1 inserts a processing head 10 into a bore of a cylinder block of a vehicle engine as a work and performs boring processing. The non-circular bore processing device 1 comprises a rotational driving mechanism 20 for rotating the processing head 10, a reciprocating mechanism 30 for advancing and retracting the rotational driving mechanism 20, a controller (cam driving device) 40 for controlling the above parts, a circularity measuring unit 51 for measuring the internal shape of the bore of the work, and a master (superordinate) computer 52 analyzing the measurement result of the circularity measuring unit 51 and outputting an analysis result to the controller 40.

The rotational driving mechanism 20 has a cylindrical arbor, a shaft 22 mounted in the arbor 21, an arbor motor 23 for rotationally driving the arbor 21, a shaft motor 24 for rotationally driving the shaft 22, and a housing 25 in which the arbor motor 23 is mounted. Here, the rotational shaft (first rotational shaft) of the arbor 21 and the rotational shaft (second rotational shaft) of the shaft 22 are coaxial with each other.

In the housing 25 are mounted not only the arbor motor 23, but also a bearing 251 for rotatably holding the arbor 21, a first rotary encoder 252 for detecting the rotational speed and the rotational angle of the arbor 21, and a nut portion 253 with which the reciprocating mechanism 30 is threadably engaged. The shaft motor 24 is provided with a second rotary encoder 241 for detecting the rotational speed and the rotational angle of the shaft 22.

The reciprocating mechanism 30 is a feeding screw mechanism, and has a threaded shaft portion 31, a reciprocating motor 32 for rotationally driving the shaft portion 31, and a third rotary encoder 33 for detecting the rotational speed and the rotational angle of the shaft portion 31. The shaft portion 31 is threadably engaged with the nut portion 253 of the housing 25.

According to the reciprocating mechanism 30, the shaft portion 31 is rotated by driving the reciprocating motor 32, whereby the rotational driving mechanism 20 can be reciprocated (advanced and retracted).

The processing head 10 has a cylindrical arbor 11 which is integrally joined to the arbor 21, a shaft 12 which is mounted in the arbor 11 and integrally joined to the shaft 22, and a cutting bite 13 provided to the outer peripheral surface of the arbor 11 so as to protrude from and retract into the arbor 11.

A penetration hole 111 extending in a direction intersecting with the rotational axis of the arbor 11 is formed at the tip side of the arbor 11. The cutting bite 13 is formed in a rod-like shape, and it is inserted into the penetration hole 111 functioning as a mount hole in which the cutting bite 13 is mounted, and urged toward the shaft 12 by an urging unit (not shown).

As shown in FIGS. 2A and 2B, the shaft 12 is provided with a cam 121 for pressing the cutting bite 13 in a protruding direction along which the cutting bite 13 protrudes from the outer peripheral surface of the arbor 11. The cam 121 is designed in a perfectly circular shape (hereinafter merely referred to as "circular shape", for example, and the shaft 12 is provided at a position displaced from the center of this circle. Accordingly, the distance from the rotational center of the shaft 12 to the peripheral distance of the cam 121 varies continuously. The shape of the cam 121 is not limited to the circular shape, however, it is preferably the circular shape because the cost can be reduced.

The base end edge of the cutting bite 13 abuts against the peripheral edge of the cam 121. Accordingly, by changing the angle of the shaft 12 with respect to the arbor 11, the abutting portion of the peripheral edge of the cam 121 which abuts against the cutting bite 13 is varied, and thus the protrusion amount of the cutting bite 13 from the outer peripheral surface of the arbor 11 is varied.

FIG. 2A schematically shows a state that the protrusion amount of the cam 121 is equal to t, and FIG. 2B schematically shows a state that the protrusion amount of the cutting bite 13 is equal to zero.

In FIG. 2, a line extending from the rotational center of the cam 121 to a portion of the peripheral edge of the cam 121 which is located to be farthest away from the shaft 12 is set as a reference line Q of the cam 121, and a line passing through the center axis of the cutting bite 13 is set as a reference line R of the cutting bite 13. The intersecting angle between the reference line Q of the cam 121 and the reference line R of the cutting bite 13 is set as a cam angle.

Under the state that the protrusion amount of the cutting bite 13 is equal to t, the cam angle is equal to $\alpha$. This angle $\alpha$ is set as an initial angle. Under the state that the protrusion amount of the cutting bite 13 is equal to zero, the cam angle is equal to $(\alpha+\beta)$.

When the radius of the cam 121 is represented by Cr and an offset dimension from the center of the cam 121 to the rotational center of the cam 121 is represented by Co, the maximum dimension L1 and the minimum dimension L2 from the rotational center of the cam 121 to the base end edge of the cutting bite 13 are represented by the following mathematical expressions (1) and (2).

$$L1 = Co \times \cos(\alpha) + Cr \quad (1)$$

$$L2 = Co \times \cos(\alpha+\beta) + Cr \quad (2)$$

As described above, the stroke of the cam angle is equal to β (swing angle), and the stroke of the protrusion amount of the cutting bite 13 is equal to t, and the following mathematical expression (3) is satisfied.

$$t==L1-L2=Co\times\{(\cos(\alpha)-\cos(\alpha+\beta))\} \quad (3)$$

Figure 3:
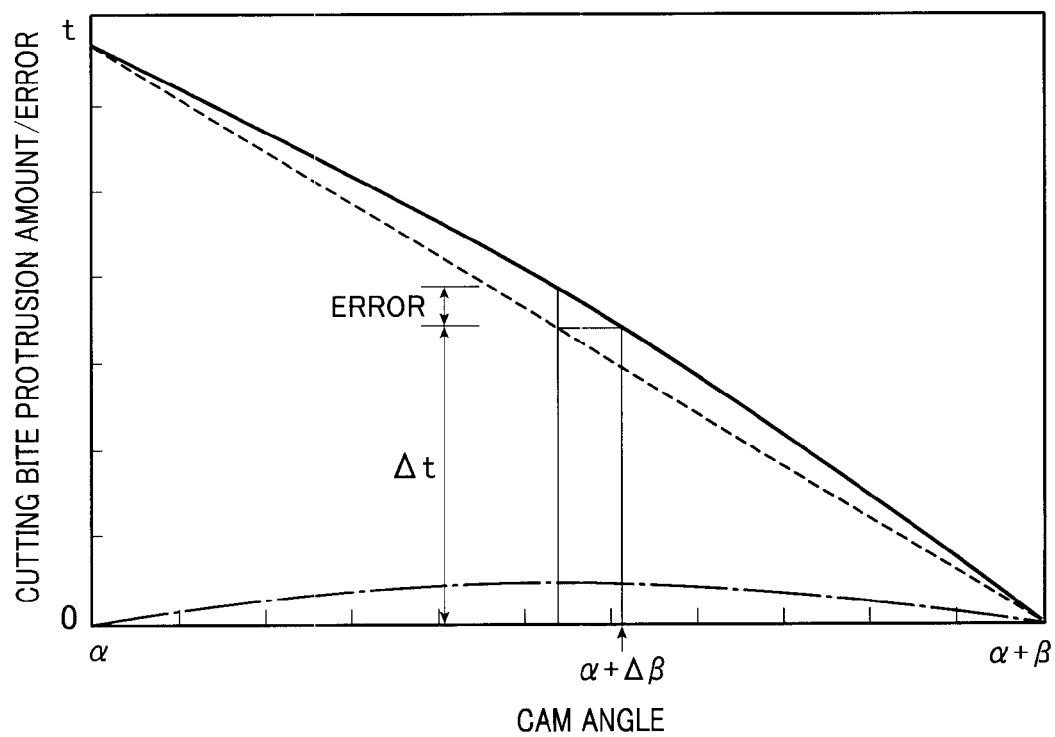
FIG. 3 is a diagram showing the relationship of a cam angle and a projection amount of a cutting bite in the non-circular bore processing device according to the embodiment.

The relationship between the cam angle and the protrusion amount of the cutting bite based on this mathematical expression (3) is shown in FIG. 3.

As indicated by a solid line of FIG. 3, the protrusion amount of the cutting bite 13 varies non-linearly, that is, in an arc shape with respect to the variation of the cam angle. On the other hand, as indicated by a broken line of FIG. 3, the protrusion amount of the cutting bite varies linearly in the case of an ideal cam. Accordingly, as compared with a case where the protrusion amount of the cutting bite is varied linearly, the error of the protrusion amount of the cutting bite 13 becomes largest in the neighborhood of the intermediate value between the cam angle α (initial angle) and the cam angle (α+β).

Accordingly, when it is necessary to protrude the cutting bite 13 by only Δt, the cam angle (α+Δβ) corresponding to this protrusion amount (Δt) is set as an instruction value of the cam angle. Accordingly, the protrusion amount can be easily varied linearly.

Specifically, a protrusion amount/cam angle associating table 90 (see FIG. 1) for associating the protrusion amount (Δt) and the instruction value (α+Δβ) of the cam angle is generated and stored in a memory 91 of a main controller 41 in advance so that this instruction value (α+Δβ) is called out by a synchronous controller 42 described later. The protrusion amount/can angle associating table 90 may be stored in the synchronous controller 42 in place of the memory 91 of the main controller 41. Furthermore, it may be input from the master computer 52.

Returning to FIG. 1, the controller 40 rotates the arbor 21 and the shaft 22 in synchronism with each other, and advances or retards the phase of the rotational angle of the shaft 22 with respect to the phase of the rotational angle of the arbor 21, whereby the protrusion amount of the cutting bite 13 from the cuter peripheral surface of the arbor 11 of the cutting bite 13.

This controller 40 has the main controller 41, the synchronous controller 42, a first servo amplifier 43, a second servo amplifier 44 and a third servo amplifier 45.

According to the output from the master computer, the main controller 41 drives the arbor motor 23 and the reciprocating motor 32 through the first servo amplifier 43 and the third servo amplifier 45 to control the cutting speed and the position on the axial line of the cutting bite 13 for a work. That is, the main controller 41 is a device for performing the same operation as a so-called NC (Numerical Control) controller.

The synchronous controller 42 outputs an instruction signal in accordance with the orientation of the cutting bite 13 (that is, the rotational angle of the arbor 12) with respect to the bore of the work and the position on the axial line of the cutting bite 13 (that is, the rotational angle of the shaft portion 31 of the reciprocating mechanism 30) with respect to the bore of the work. Accordingly, the shaft motor 24 is driven through the second servo amplifier 44, and the protrusion dimension of the cutting bite 13 (that is, the protrusion amount of the cutting bite 13 from the outer peripheral surface of the arbor 11) is adjusted.

Specifically, a map representing the relationship between both of the rotational angle of the arbor 21 and the position in the reciprocating direction of the processing head 10 (that is, the position on the axial line of the cutting bite 13 with respect to the bore of the work) and the protrusion amount of the cutting bite 13 is generated on the basis of the output from the master computer. The synchronous controller 42 stores this map into a memory thereof.

The map represents an arrangement of parameters. That is, two-dimensional data concerning the cross-section of the bore which represent the relationship of the rotational angle of the arbor 21 and the protrusion amount of the cutting bite 13 are determined at each position in the reciprocating direction of the processing head 10 (that is, the position on the axial line of the cutting bite 13 with respect to the bore of the work), and the two-dimensional data of these cross-sections of the bore are arranged in the axial line direction.

The synchronous controller 42 refers to the map representing the relationship of the protrusion amount of the cutting bite 13 stored in the memory of the synchronous controller 42 on the basis of the rotational speed and rotational angle of the arbor 22 detected by the first rotary encoder 252 (specifically, the number of pulses generated by the rotary encoder every unit time, that is, the number of pulses for a sampling time), and the rotational angle of the shaft portion 31 detected by the third rotary encoder (specifically, the number of pulses generated by the rotary encoder per unit time, that is, the number of pulses for a sampling time), and drives the shaft motor 24 through the second servo amplifier 44.

At this time, the second servo amplifier 44 executes feedback control on the shaft motor 24 in accordance with the rotational speed and rotational angle of the shaft 22 (specifically, the number of pulses generated by the rotary encoder per unit time, that is, the number of pulses for the sampling time) detected by the secondary rotary encoder 241.

Next, the control of the shaft 22 by the synchronous controller 42 will be described with reference to FIG. 4.

Figure 4:
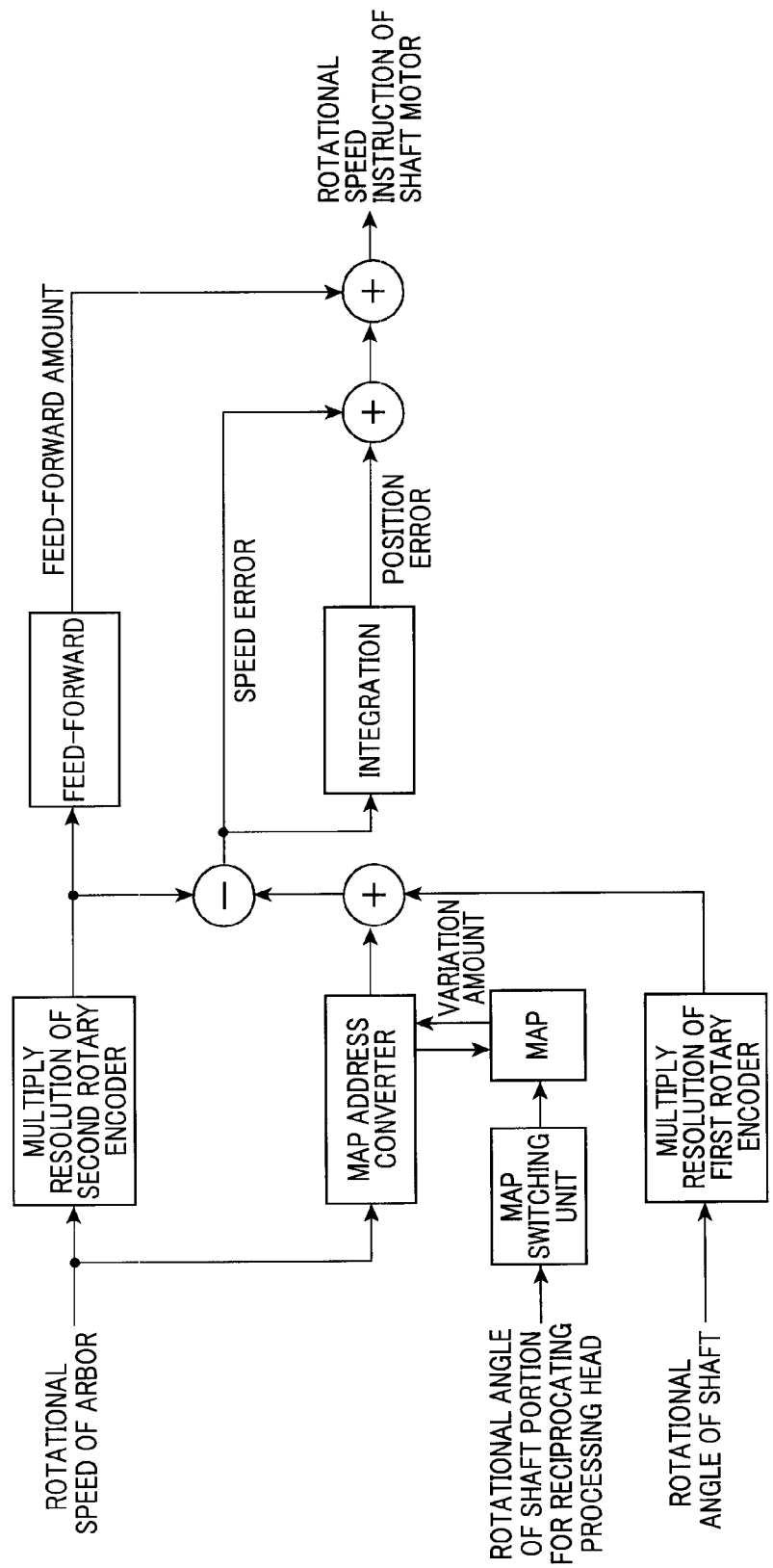
FIG. 4 is a block diagram showing the operation of a synchronous controller of the non-circular bore processing device according to the present invention.

FIG. 4 is a block diagram showing the operation of the synchronous controller 42.

When the arbor 21 and the shaft 22 are perfectly synchronized with each other, the rotational speed of the arbor 21 is first multiplied by the resolution (PG2) of the second rotary encoder 241 for detecting the rotational speed of the shaft 22, the rotational speed of the shaft 22 is also multiplied by the resolution (PG1) of the first rotary encoder 252 for detecting the rotational speed of the arbor 21, and then the difference between both the multiplication results is calculated.

The above multiplication is executed because the resolution (PG1) of the first rotary encoder 252 and the resolution (PG2) of the second rotary encoder 241 are different form each other and thus the resolutions are matched with each other in consideration of the ratio of these resolutions.

Next, the calculated error is calculated as a speed error, the thus-calculated speed error is integrated and the integration result is set as a position error.

Subsequently, a feed-forward amount is determined from the rotational speed of the arbor 21, the speed error and the position error are added to each other, and the addition result is set as a speed instruction to the shaft motor 24. In this case, the phase difference between the arbor and the cam is kept, and the protrusion amount of the cutting bite 13 is fixed.

In a case where the arbor 21 and the shaft 22 are displaced from each other in phase, when the rotational angle of the shaft portion 31 for reciprocating the processing head 10 is obtained, the position in the reciprocating direction of the processing head 10 (that is, the position on the axial line of the cutting bite 13 with respect to the bore) is calculated by the controller 40, and the map representing the relationship of the rotational angle of the arbor 21 described above and the protrusion amount of the cutting bite 13 (the two-dimensional cross-section data of the bore) is switched in accordance with the calculated position in the reciprocating direction of the processing head 10 by a map switching unit.

Furthermore, when the rotational speed and rotational angle of the arbor 21 are obtained, a map address converter determines the rotational position of the arbor 21.

Subsequently, the map address converter refers to the above map to call out the protrusion amount data of the cutting bite 13 corresponding to the rotational angle of the arbor 21, extracts the difference between the call-out protrusion amount data and previously call-out protrusion amount data, and then adds the extracted difference as a variation (that is, speed) to the rotational speed instruction of the shaft motor 24.

Next, the procedure of executing the boring processing on the bore of the cylinder block of the vehicle engine by using the thus-constructed non-circular bore processing device 1 will be described with reference to the flowchart of FIG. 5.

Figure 6A:
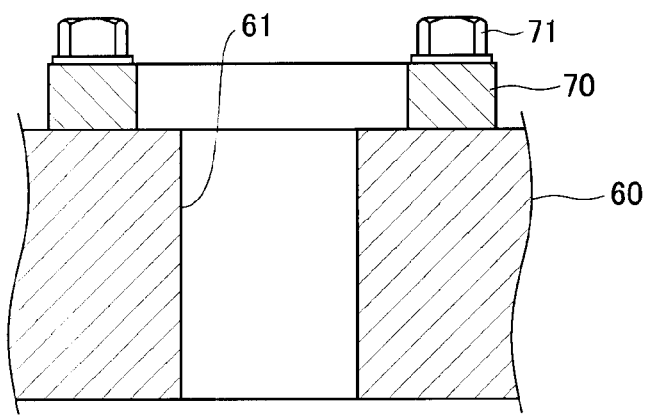
FIGS. 6A-6C are cross-sectional view showing the cylinder block to be subjected to the boring processing by using the non-circular bore processing device according to the embodiment.

First, in step S1, a dummy head 70 is secured to a cylinder block 60 as a cylinder block raw material by bolts 71 as shown in FIG. 6A. The shape and material of the dummy head 70 are set so as to imitate a cylinder head product, and a hole in which the processing head 10 of the non-circular bore processing device 1 can be inserted is formed at the center potion of the dummy head 70.

Subsequently, in step S2, the cylinder block 60 is located at a predetermined position, and the bore 61 is processed so as to have a desired circularity by the non-circular bore processing device 1.

Figure 6B:
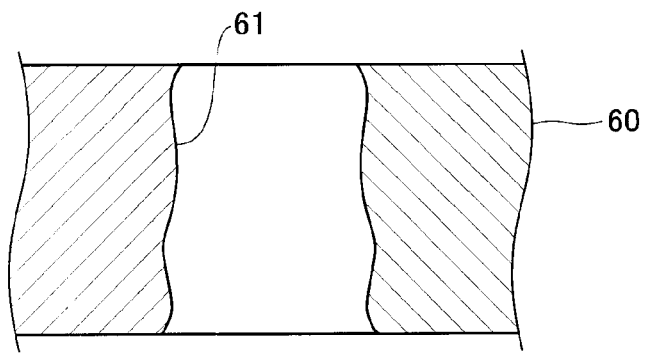
Figure 6C:
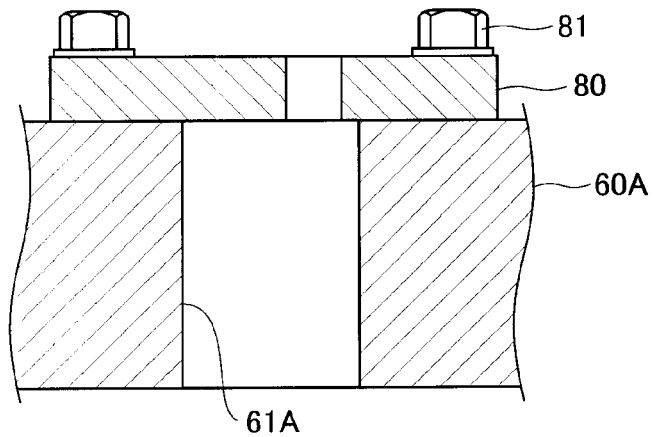

Subsequently, in step S3, the fastening based on the bolts 71 is released from the cylinder block 60, and the dummy head 70 is detached. At this time, as shown in FIG. 6B, the inner diameter (the cross-sectional shape) of the bore of the cylinder block 60 is slightly deformed from the state of FIG. 6A. This is because the stress caused by the assembly of the dummy head 70 is released.

Figure 7A:
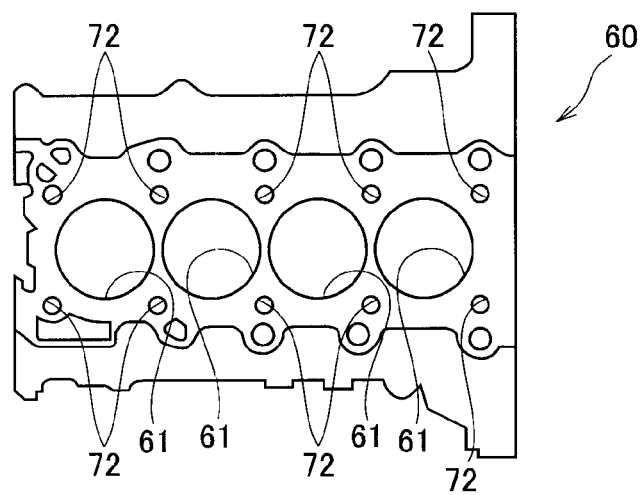
FIGS. 7A-7C are diagrams showing a deformation state of the cylinder block according to the embodiment.
Figure 7B:
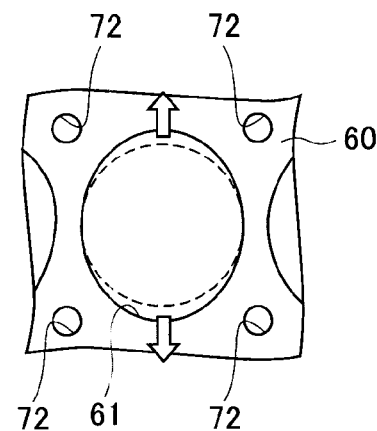

Specifically, as shown in FIG. 7A, four bores 61 are formed in the cylinder block 60 so as to be arranged in alignment with one another. Bolt holes 72 in which bolts 71 are threadably fitted are formed around each bore 61.

Figure 7C:
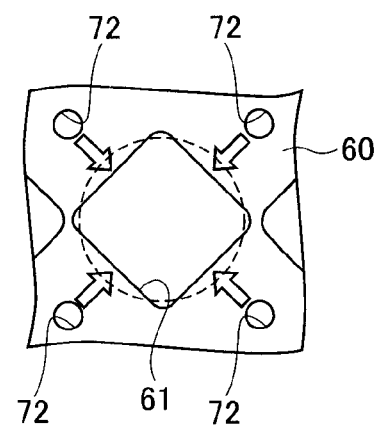

When the dummy head is detached from the cylinder block 60, the press force of the dummy head 70 is released, and thus the internal diameter shape (that is, the profile of the cross-section) at the dummy head side of the bore 61 is deformed to an elliptic shape. Furthermore, the stress acting on the gap between the screw thread of the bolt hole 72 and the screw thread of the bolt 71 is also removed, and thus the internal diameter shape (the bore cross-sectional shape) at the crank shaft side of the bore 61 is also deformed to a rectangular shape as shown in FIG. 7C.

Accordingly, in this embodiment, in a step of executing frequency analysis on the internal diameter shape of the bore (a step of calculating analysis internal diameter shape parameters), the frequency analysis is executed till four orders. This is because the deformation of the bore of the cylinder block an be substantially reproduced by the frequency analysis till four orders. That is, the quartic (fourth-order) component represents a rectangular component, the tertiary (third-order) component represents a triangular component, and a quadratic (second-order) component represents an elliptic component. Therefore, the frequency analysis from zero-order till fourth-order is executed to represent the internal diameter shape (cross-sectional shape) with cosine waves, and these cosine waves are combined, whereby the deformation of the bore of the cylinder block can be reproduced, and higher-order noises can be removed.

Furthermore, if the cross-sectional two-dimensional shape $(X_I, Y_I)$ is stored as a point group $(X_I, Y_I)$ in a normal NC data format, the data amount is enormous. However, by storing the cross-sectional two-dimensional shape in a curved line data format by using cosine waves as in the case of the present invention, the data amount can be remarkably reduced, so that the data processing speed can be increased.

In other words, in order to form a cross-sectional non-circular bore so as to compensate for the deformation of the bore of the cylinder block when the cylinder head is assembled to the cylinder block, only the frequency analysis from O-order till fourth-order may be executed, and thus the data amount can be reduced.

In this embodiment, the frequency analysis is executed till fourth-order. However, the frequency analysis may be executed till fiftieth-order, one hundredth order or further higher order in accordance with the shape of the bore. For example, when one round shape of a cross-sectional non-circular bore is represented in the normal NC data format every 1°, 720 parameters are required. However, when it is represented in the curved line data format of 50th-order, 101 parameters may be used. That is, a radius error (0-order), 50 n-order amplitudes and 50 n-order phases are required. As described above, even when the frequency analysis is executed till 50th-order, the data amount can be reduced and the data processing speed can be increased by storing the data in the curved line data format.

In the above embodiment, the boring processing is executed while the dummy head is mounted on the cylinder block, and then the dummy head is detached to measure the internal diameter shape of the bore. In place of this method, the following method may be adopted. That is, as shown in FIG. 1, a three-dimensional model in which the bore of the cylinder block is formed to have a desired cross-sectional elliptic shape is created in a virtual space on a computer by a CAD system 53. Thereafter, in a CAE system 54, a cylinder head of a three-dimensional model is assembled to the cylinder bloc of the three-dimensional model containing the bore having the desired cross-sectional elliptic shape which is created in the virtual space on the computer by the CAD system 53. It is simulated in the CAE system 54 how the desired cross-sectional elliptic shape of the bore concerned is deformed by assembling the cylinder head of the three-dimensional model to the cylinder block of the three-dimensional model and what shape the bore has after the assembly. That is, this method can be used in place of the method of executing the boring processing while the dummy head is actually mounted on the cylinder block, detaching the dummy head from the cylinder block and then actually measuring the internal diameter shape (the bore cross-sectional shape).

Therefore, in step S4, the internal diameter shape of the bore 61 of the cylinder block is measured at predetermined intervals on the axial line of the bore 61 after the dummy head 70 is detached, and the measurement result is stored as internal diameter shape data in the master computer 52. When simulation is executed in the CAE system 54, the shape of the bore after the assembly which is simulated in the CAE system 54 is directly stored as internal diameter shape data in the master computer 52.

In step S5, the frequency analysis is executed on the basis of the internal diameter shape data, and analysis internal diameter shape parameters are calculated.

Subsequently, in step S6, the calculated analysis internal diameter shape parameters are input to the synchronous controller 42 of the non-circular bore processing device 1 to generate a synthetic internal diameter shape map.

In step S7, a cylinder block 60A of a new cylinder block raw material different form the cylinder block 60 which has been already subjected to the boring processing is disposed at a predetermined position. Subsequently, under the control of the synchronous controller 42, the boring processing based on the generated synthetic internal diameter shape map is executed on the cylinder block 60A.

In step S9, a product cylinder head 80 which is different form the dummy head 70 and used as an actual product is prepared, and, by using bolts 81, the product cylinder head 80 is mounted on the new cylinder block 60A which has been subjected to the boring processing as shown in FIG. 60. At this time, the internal diameter shape of the bore 61A of the cylinder block 60A is set to the same desired cross-sectional elliptic shape as the bore 61 of the cylinder block 60.

Next, the detailed procedure from the measurement of the bore internal diameter shape of the step S4 till the boring processing of the step S7 will be described with reference to the flowchart of FIG. 8.

In step S11 (S4), for example, four measurement points M1 to M4 are set at predetermined intervals on the axial line of the bore for all cylinder engines by a circularity measuring unit 51, and the internal diameter shape of the bore is measured at each of the measurement points M1 to M4.

Specifically, for all the cylinder engines, a sensor such as an air microsensor, a proximity sensor, a laser sensor or the like is inserted into the bore and moved along the axial line with being rotated. The internal diameter shape of the bore at each of the measurement point is measured, and set as internal diameter shape data.

In this example, the measurement is performed at predetermined intervals. However, the measurement may be performed at unequal intervals, for example, at several places of the cylinder head side of the cylinder block, or conversely at several places of the crank shaft side of the cylinder block.

Figure 9:
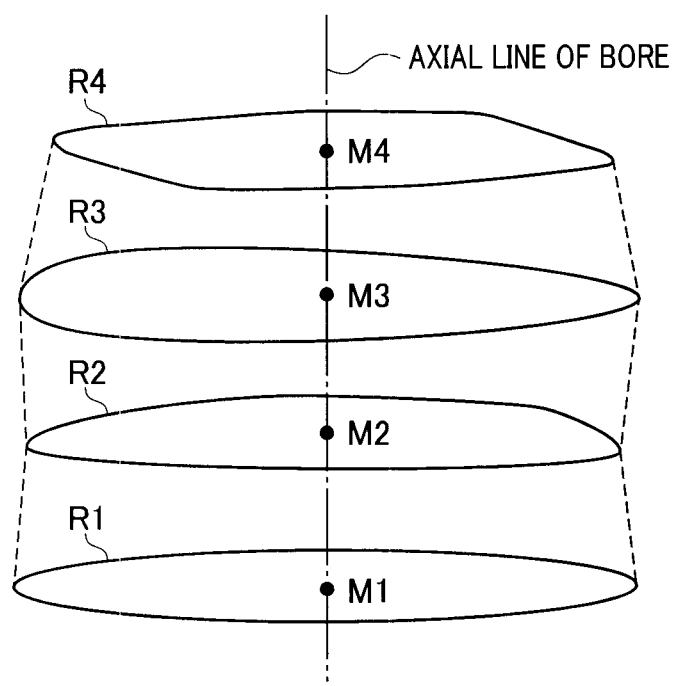
FIG. 9 is a schematic diagram showing the internal shape of the bore measured at measurement points of the cylinder block according to the embodiment.

FIG. 9 is a schematic diagram showing the bore internal diameter shapes R1 to R4 measured at the respective measurement points M1 to M4.

As shown in FIG. 9, the bore internal diameter shapes R1 to R4 at the respective measurement points M1 to M4 are different from one another, and they are non-circular shapes such as an elliptic shape, a triangular-rectangular shape, an eccentric perfectly circular shape or the like.

Figure 10:
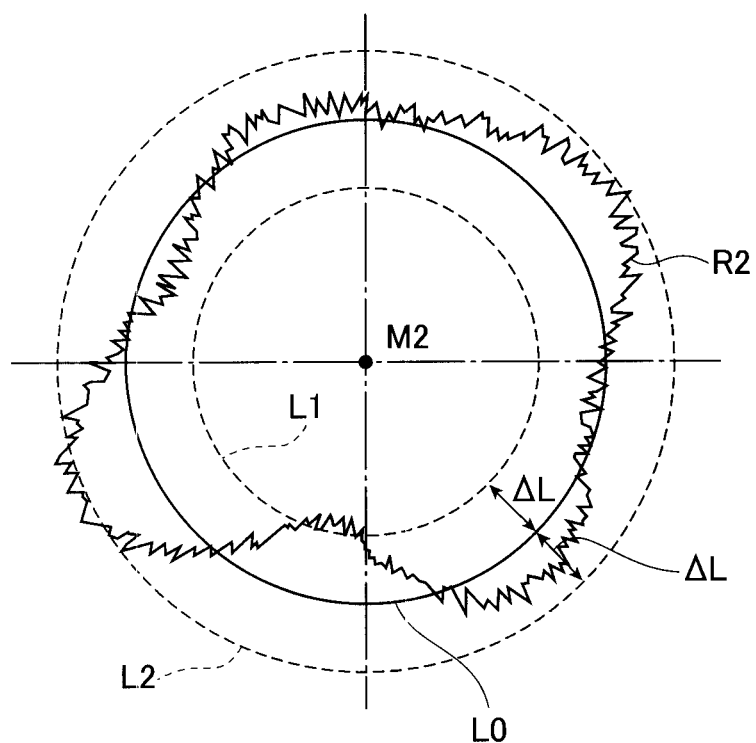
FIG. 10 is a cross-sectional view showing the internal shape of the bore measured at one measurement point of the cylinder block according to the embodiment.
Figure 11:
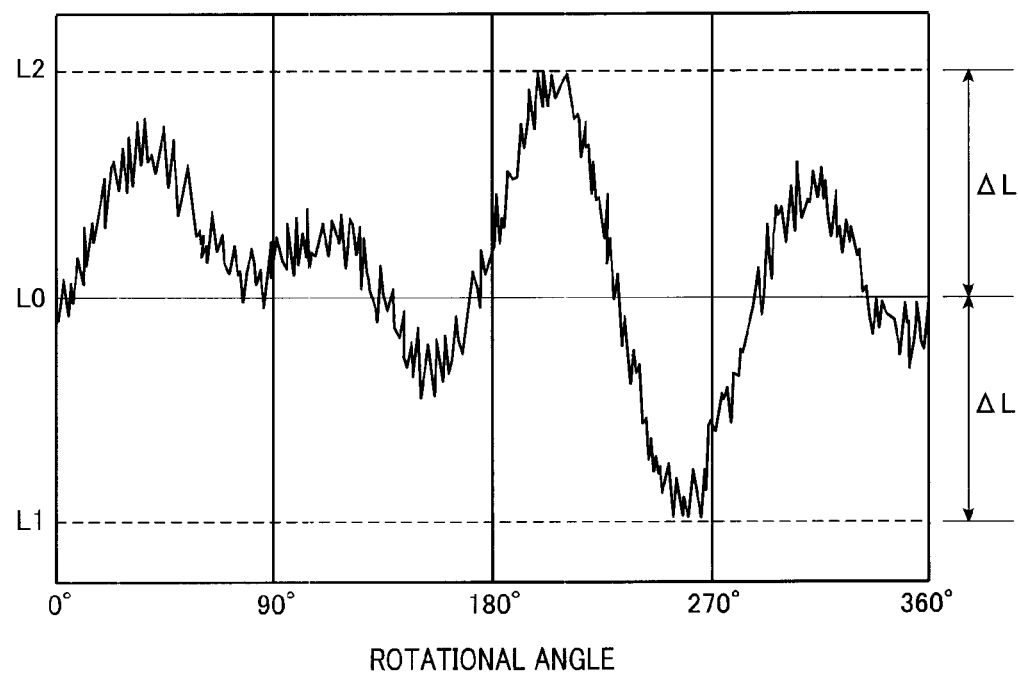
FIG. 11 is a diagram showing the internal shape of the bore measured at one measurement point of the cylinder block according to the embodiment when the rotational axis of the bore is set to the abscissa axis.

FIG. 10 is a cross-sectional view showing the bore internal diameter shape measured at one of the measurement points M1 to M4, for example, the bore internal diameter shape R2 measured at the measurement point M2. FIG. 11 is a graph showing the bore internal diameter shape R2 of FIG. 10 when the rotational angle is set as the abscissa axis.

In FIGS. 10 and 11, the position on the inner peripheral surface of the bore when the deformation amount of the bore is set to zero is set as a reference line L0. An inward position which is located at the inside of the reference line L0 by only ΔL is represented by L1, and an outward position which is located at the outside of the reference line L0 by only ΔL is represented by L2. As shown in FIGS. 10 and 11, it is apparent that the measured bore internal diameter shape has unevenness of about ΔL and further contains higher-order noises.

In step S12, the bore internal diameter shape at each of the measurement points M1 to M4 is subjected to frequency analysis by the master computer 52 to extract an n-order component of an error to the perfect circle, the amplitude and phase thereof are determined, and the analysis internal diameter shape parameters (An, Pn) for the amplitude and the phase are generated.

Specifically, according to the following mathematical expressions (4) to (7), the protrusion amount from the reference line L0 is expressed by a function $x(\theta)$ of the angle $\theta$, and Fourier transform is executed according to the following mathematical expressions to determine the amplitude An and the phase Pn of the n-order component.

Here, the amplitude Ao is represented by the error of the radius to the perfect circle as the reference line, the amplitude $A_1$ represents an eccentricity from the perfect circle as the reference line, the amplitude $A_2$ represents an elliptical component, the amplitude $A_3$ represents a triangular component, and the amplitude $A_4$ represents a rectangular component. Po is unnecessary.

$$Icn = \frac{1}{2\pi}\int_0^{2\pi} x(\theta)\cos(n\theta)d\theta \qquad (4)$$

$$Isn = \frac{1}{2\pi}\int_0^{2\pi} x(\theta)\sin(n\theta)d\theta \qquad (5)$$

$$An = 2(Icn^2 + Isn^2)^{1/2} \qquad (6)$$

$$Pn = \tan^{-1}(Icn/Isn) \qquad (7)$$

When these analysis internal diameter shape parameters (An, Pn) of the n-order components are subjected to Fourier inverse transform and the protrusion amount from the reference line L0 is represented by the function $T(\theta)$ of the angle $\theta$, the following mathematical expression (8) is obtained.

$$\begin{aligned}T\theta &= -(A_0 + A_1\cos(\theta + P_1) + A_2\cos(2\theta + P_2) + \\ &\quad A_3\cos(3\theta + P_3) + \ldots + A_k\cos(k\theta + P_k)) \\ &= -\left(A_0 + \sum_{n=1}^{k} A_n\cos(n\theta + P_n)\right)\end{aligned} \qquad (8)$$

Next, the k value in the mathematical expression (8) is calculated in the following procedure according to the Bode diagram of the non-circular bore processing device 1 shown in FIG. 12.

The Bode diagram represents the characteristic based on torsional rigidity from the shaft motor 24 till the tip of the cutting bite 13, and it is created according to the following procedure.

That is, a sine wave signal having fixed frequency and amplitude is applied to the shaft motor 24. The rotational angle at the base end side of the shaft 22 is detected by a second rotary encoder 241, and the displacement of the tip of the cutting bite 13 is detected by a sensor (not shown). These two outputs are subjected to Fourier transform so that the amplitude ratio and the phase difference at the tip side of the cutting bite 13 to the shaft motor 24 are determined and plotted.

Figure 12:
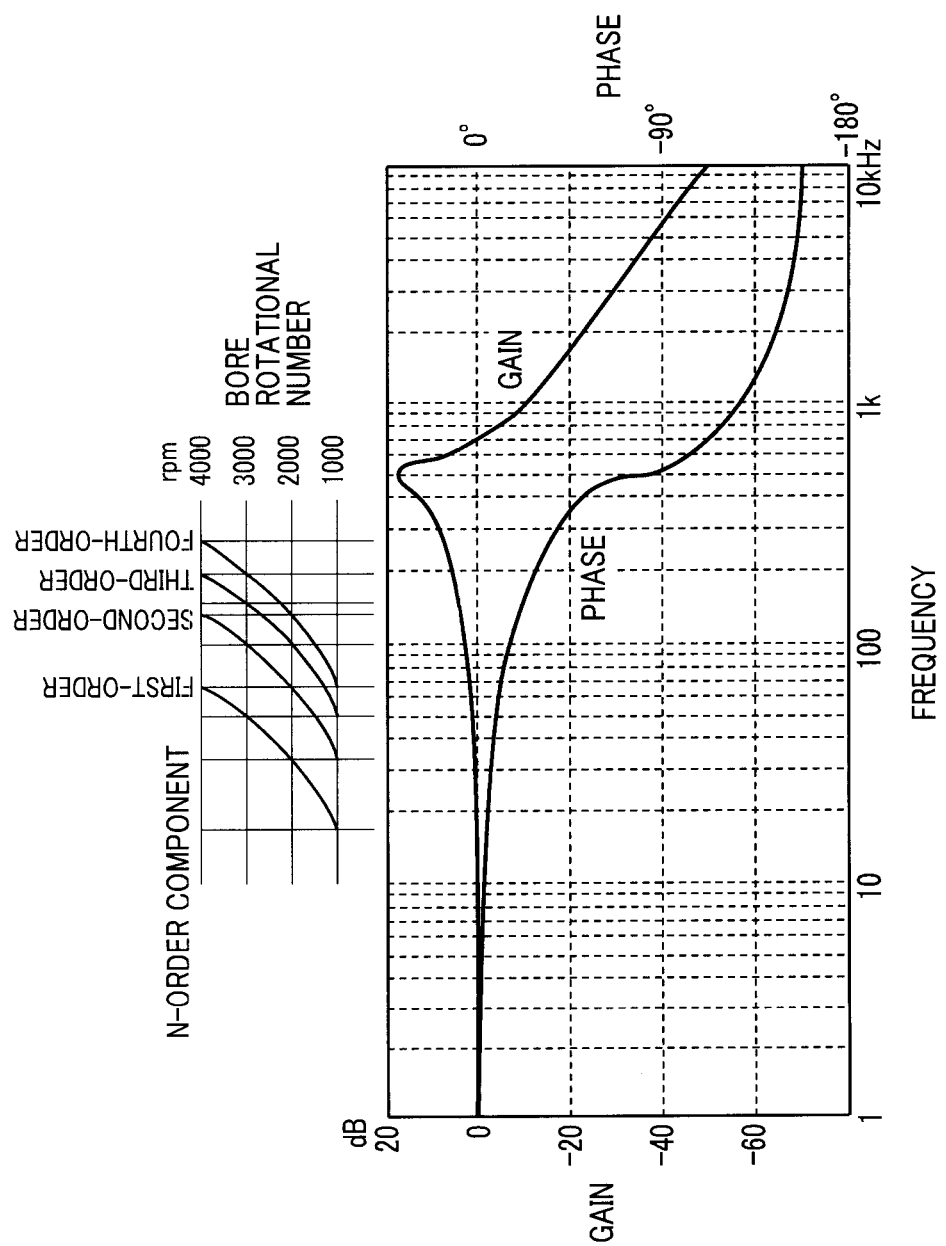
FIG. 12 is a Bode diagram of the non-circular bore processing device according to the embodiment.

According to the Bode diagram of FIG. 12, it is apparent that a resonance frequency exists in the neighborhood of 500 Hz, the phase is greatly displaced and the behavior is unstable. Accordingly, it is recognizable that a usable frequency area is limited to the range from 200 Hz to 300 Hz. Therefore, in consideration of the limitation of responsibility of the driving mechanism, it is understood that k=4 is practical as the minimum value required for the cutting work.

Figure 13:
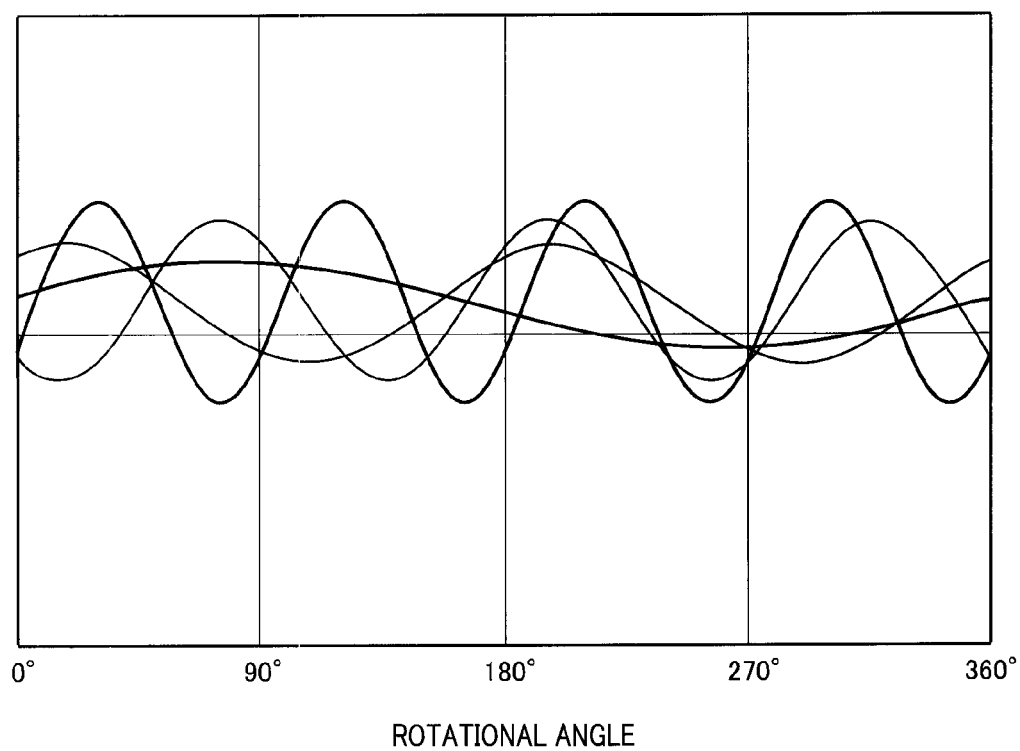
FIG. 13 is a diagram showing frequency components constituting the internal shape of the bore of the cylinder block according to the embodiment.

Accordingly, when in the mathematical expression (8), k is set to 4 and waveforms of four frequencies $A_1 \times \cos(\theta+P_1)$, $A_2 \times \cos(2\theta+P_2)$, $A_3 \times \cos(3\theta+P_3)$ and $A_4 \times \cos(4\theta+P_4)$ are plotted, a graph shown in FIG. 13 is obtained.

Figure 14:
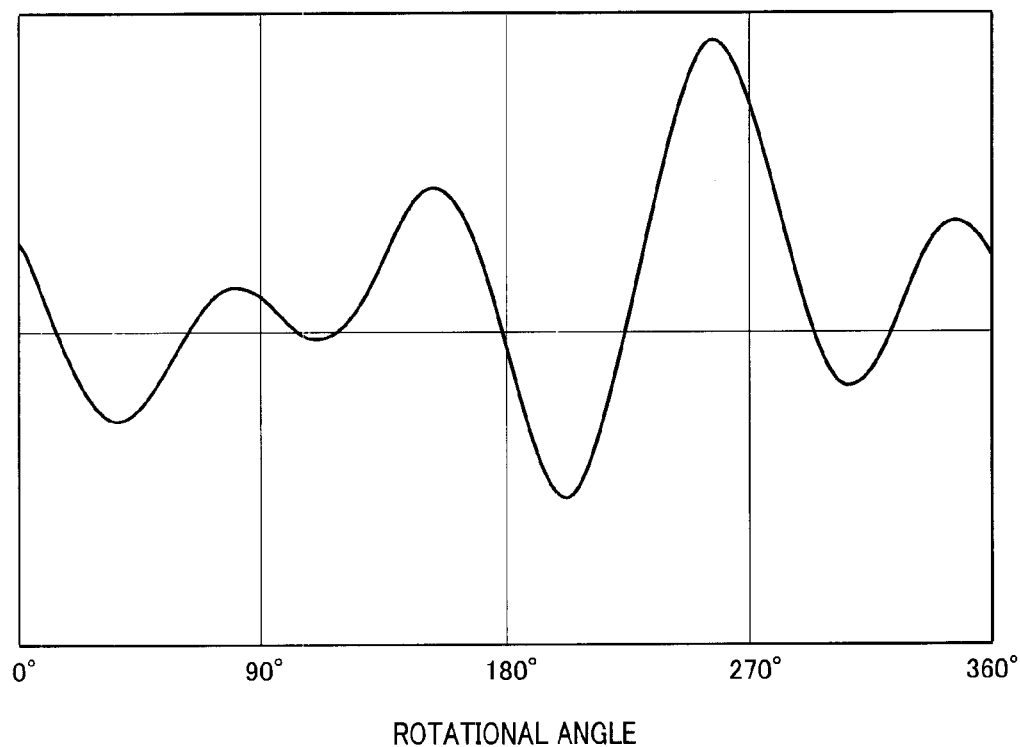
FIG. 14 is a diagram showing the frequency components constituting the internal shape of the cylinder block according to the embodiment when the frequency components are combined and reversed.

Next, when these four frequency waveforms are combined with one another and plotted while the polarity is inverted to correct the shape, a graph shown in FIG. 14 is obtained.

In step S13, a gain/phase map concerning gain and phase is created on the basis of the Bode diagram of FIG. 12 by the master computer 52, and the created gain/phase map is output to the synchronous controller 42. In step S14, the analysis internal diameter shape parameters ($A_n$, $P_n$) for one cylinder engine are output to the synchronous controller 42.

In step S15, the synchronous controller 42 refers to the gain/phase map and determines the error parameters ($\Delta a_n$, $\Delta p_n$) corresponding to the rotational number being used.

That is, as shown in the Bode diagram of FIG. 12, even when the shaft motor 24 is driven within the usable area, the gain and the phase are displaced, and thus a processing error occurs. Therefore, the n-order frequency in the rotational area being used is determined, and the gain and the phase delay are determined from the determined n-order frequency to obtain the error parameters ($\Delta a_n$, $\Delta p_n$).

For example, in FIG. 12, when the rotational number of the shaft motor 24 is set to 3000 rpm, the frequency of the fourth-order component is equal to 3000/60×4=200 Hz, and thus the gain and the phase are read out as about +6 dB and about −27°, respectively. Accordingly, in this case, the protrusion amount of the cutting bite is retarded by about 27°, and the cutting bite operates with about double amplitude ($10^{6/20} \approx 2$, $20 \log_{10}(2) \approx 6$ dB). Therefore, the fourth-order analysis internal diameter shape parameters are corrected by setting the amplitude correction $\Delta a_4$ to 0.5 and setting the phase correction $\Delta p_4$ to +27. Likewise, the analysis internal diameter shape parameters of the third-order to the primary-order are corrected.

In step S16, the analysis internal shape parameters ($A_n$, $P_n$) are corrected with the error parameters ($\Delta a_n$, $\Delta p_n$) by the synchronous controller 42, and subjected to Fourier inverse transform.

In step S17, under the control of the synchronous controller 42, the data which have been subjected to Fourier inverse transform is corrected on the basis of the cam error map of FIG. 3 and converted to the protrusion amount of the cutting bite 13, thereby creating a protrusion amount map representing the relationship between the rotational angle and the protrusion amount of the cutting bite 13 (the synthetic internal diameter shape map).

In step S18, under the control of the synchronous controller 42, the a detailed protrusion amount for the boring processing is created through proportional interpolation processing on the basis of the protrusion map of the cutting bite 13.

Figure 15A:
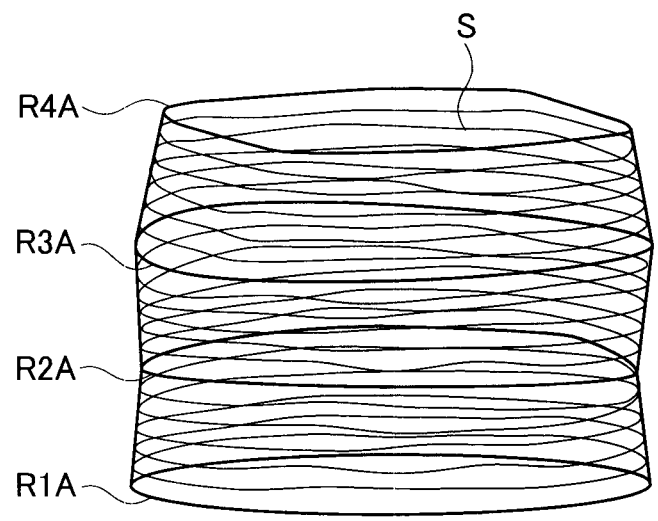
FIGS. 15A-15B are diagrams showing proportional interpolation processing using a projection amount map generated by the non-circular bore processing device according to the embodiment.

When the loci of the tip of the cutting bite 13 of the protrusion amount map are represented by R1A to R4A as shown in FIG. 15A, the actual locus S of the cutting bite 13 is spiral, and the interval (pitch) of the actual locus S is smaller than the interval between the loci R1A to R4A. Therefore, the detailed protrusion amount map is required.

Figure 15B:
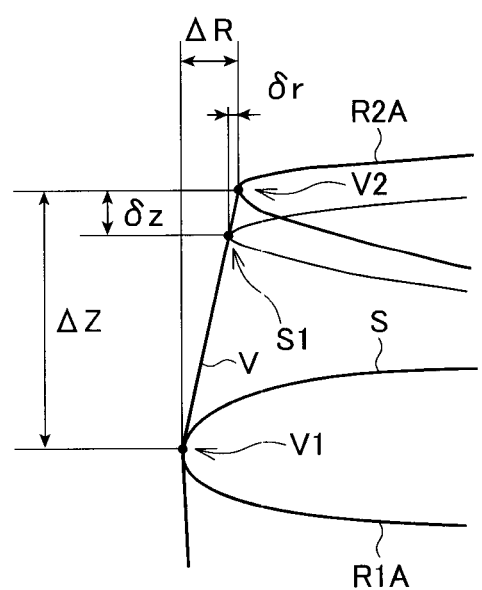

Specifically, for example, the position of a point S1 on the locus S located between the locus R1A and the locus R2A which are adjacent to each other in the vertical direction is determined as shown in FIG. 15B. A line V passing through the point S1 is drawn, and the intersecting points between the line V and each of the loci R1A and R2A are represented by points V1 and V2. Furthermore, the interval in the height direction between the point V1 and the point V2 is represented by $\Delta Z$, the interval in the horizontal direction between the point V1 and the point V2 is represented by $\Delta R$, the interval in the height direction between the point V2 and the point S1 is represented by $\delta z$, the interval in the horizontal direction between the point V2 and the point S1 is represented by $\delta r$, and the position of the point S1 is determined according to the following mathematical expression (9).

$$\Delta R : \delta r = \Delta Z : \delta z \quad (9)$$

In step S19, under the control of the synchronous controller 42, the protrusion amount of the cutting bite 13 is determined on the basis of the rotational angle of the arbor 21 and the position in the reciprocating direction of the processing head 10 according to the stored map.

In step S20, under the control of the synchronous controller 42, non-circular processing is executed according to the protrusion amount of the cutting bite 13 while the phase of the shafts 12, 22 is advanced or retarded in angle with respect to the arbor 21 on the basis of the above-described protrusion amount/cam angle associating table in which the protrusion amount ($\Delta t$) and the instruction value of the cam angle ($\alpha + \Delta \beta$) are associated with each other.

In step S21, it is determined whether the processing has been completed on all the cylinder engines. When the determination of the step S21 is YES, the processing is finished. When the determination of the step S21 is NO, the processing returns to the step S14.

As described above, according to this embodiment, the phase of the rotational angle of the shaft 22 is advanced or retarded with respect to the phase of the rotational angle of the arbor 11 according to the protrusion amount/cam angle associating table 90 in which the rotational angle of the cam 121 and the protrusion amount of the cutting bite 13 obtained on the basis of the rotational angle are associated with each other. Therefore, the protrusion amount of the cutting bite 13 can be properly adjusted while using the cam 121 having any cam profile. Accordingly, the inner peripheral surface of the non-circular bore can be processed with high precision. Furthermore, the mechanism of adjusting the protrusion amount of the cutting bite 13 through the rotation of the cam 121 is adopted, and thus the construction of the processing head 10 can be simplified.

According to this embodiment, when the rotational speed of the arbor 11 and the rotational speed of the shaft 22 are synchronized with each other, the rotational speed of the arbor 21 is multiplied by the resolution of the second rotary encoder 241 for detecting the rotational speed of the shaft 22, the rotational speed of the shaft 22 is multiplied by the resolution of the first rotary encoder 252 for detecting the rotational speed of the arbor 21, and the speed error is calculated from the difference between both the multiplication results. Furthermore, the calculated speed error is added to the feed-forward amount determined from the rotational speed of the arbor 11, and the addition result is used as the speed instruction of the rotational speed of the shaft 22 to perform the rotation control.

According to this construction, even when the resolution of the first rotary encoder 252 and the resolution of the second rotary encoder 241 are different from each other, these resolutions can be combined with each other in consideration of the resolution ratio. Accordingly, the speed error between the arbor 11 and the shaft 22 can be accurately determined, and both the rotations can be accurately synchronized with each other.

In place of the method of controlling the rotational speed of the shaft 22 on the basis of the speed error, the speed error may be added to the feed-forward amount determined from the rotational speed of the shaft 22, and the rotation of the arbor 11 may be controlled on the basis of the addition result as the speed instruction of the rotational speed of the arbor 11.

Furthermore, according to this embodiment, the manufacturing cost of the cam 121 can be suppressed by designing the cam 121 in a perfectly circular shape.

The present invention is not limited to the above embodiment, and various modifications, improvements, etc. are contained in the present invention insofar as they can attain the object of the present invention.

For example, the non-circular bore processing device 1 is provided with the cutting bite 13 a tool, and the inner peripheral surface of the non-circular bore is subjected to cutting work. However, the type of the tool is not limited to this embodiment. That is, the present invention is applicable to any tool such as a polishing tool or the like and any processing insofar as the tool is a processing tool protruding and retracting in the radial direction of a bore.

Furthermore, the above embodiment is applied to the processing of a bore of a non-rotating work such as a cylinder block or the like. However, even when a work is a non-rotating one and a fixed cylindrical member having mount holes on the outer periphery thereof in the non-circular bore processing device 1, the present invention is applicable insofar as the processing is executed by protruding and retracting the tool in the radial direction of the bore.

What is claimed is:

1. A cam driving device for a processing device comprising:
    a cylindrical member;
    a rotational shaft provided in the cylindrical member and having a mount hole formed on an outer peripheral surface thereof;
    a cam provided to the rotational shaft so as to be rotatable relative to a portion of the rotational shaft;
    a tool mounted in the mount hole of the rotational shaft so that the tool can be protruded and retracted through the mount hole in a radial direction of the rotational shaft in accordance with a profile of the cam, the cylindrical member and the rotational shaft being axially reciprocated to process a non-circular bore;
    a system performing a simulation, under a condition that an assembly member is assembled to an assembly target member having a bore having a desired cross-sectional shape, to simulate how the bore is deformed and thus what shape the bore has after the assembly on a computer;
    a storage unit for storing a data table created on the basis of shape data obtained on the basis of the simulation and representing associating relationship between a rotational angle of the cam and a protrusion amount of the tool which is provided on a basis of the rotational angle of the cam; and
    a controller for advancing or retarding the rotational angle of the rotational shaft with respect to the cylindrical member according to the data table stored in the storage unit.

2. The cam driving device according to claim 1, wherein the rotational shaft comprises a first rotational shaft and a second rotational shaft provided in the first rotational shaft, the mount hole is formed on the outer periphery of the first rotational shaft, the cam is provided to the second rotational shaft, and the controller advances or retards a phase of the rotational angle of the second rotational shaft with respect to a phase of the rotational angle of the first rotational shaft according to the data table stored in the storage unit.

3. The cam driving device according to claim 2, further comprising a first rotation detecting unit for detecting a rotational speed of the first rotational shaft, and a second rotation detecting unit for detecting a rotational speed of the second rotational shaft, wherein the first and second rotational shafts are synchronized with each other in rotational speed, the rotational speed of the first rotational shaft is multiplied by a resolution of the second rotation detecting unit to obtain a first multiplication value, the rotational speed of the second rotational shaft is multiplied by a resolution of the first rotation detecting unit to obtain a second multiplication value, a speed error is calculated from a difference between both the first and second multiplication values, and the calculated speed error is added to an instruction value of the rotational speed of the first or second rotational shaft to control the rotation.

4. The cam driving device according to claim 1, wherein the cam is cylinder shaped with a circular end face, and a rotational center of the cam is offset from a geometric center of the circular end face of the cam.

5. A cam driving device for a processing device comprising:
    a cylindrical member;
    a rotational shaft that is provided in the cylindrical member and has a mount hole formed on an outer peripheral surface thereof;
    a cam provided to the rotational shaft;
    a tool that is mounted in the mount hole of the rotational shaft so that the tool can be protruded and retracted through the mount hole in a radial direction of the rotational shaft in accordance with a profile of the cam, the cylindrical member and the rotational shaft being axially reciprocated to process a non-circular bore;
    a system performing a simulation, under a condition that an assembly member is assembled to an assembly target member having a bore having a desired cross-sectional shape, to simulate how the bore is deformed and thus what shape the bore has after the assembly on a computer;
    a storage unit for storing a data table created on the basis of shape data obtained on the basis of the simulation and representing associating relationship between a rotational angle of the cam and a protrusion amount of the tool which is provided on a basis of the rotational angle of the cam; and
    a controller for advancing or retarding the rotational angle of the rotational shaft with respect to the cylindrical member according to the data table stored in the storage unit,
    wherein the cam is cylinder shaped with a circular end face, and a rotational center of the cam is offset from a geometric center of the circular end face of the cam.

6. The cam driving device according to claim 5, wherein the rotational shaft comprises a first rotational shaft and a second rotational shaft provided in the first rotational shaft, the mount hole is formed on the outer periphery of the first rotational shaft, the cam is provided to the second rotational shaft, and the controller advances or retards a phase of the rotational angle of the second rotational shaft with respect to a phase of the rotational angle of the first rotational shaft according to the data table stored in the storage unit.

7. The cam driving device according to claim 6, further comprising a first rotation detecting unit for detecting a rotational speed of the first rotational shaft, and a second rotation detecting unit for detecting a rotational speed of the second rotational shaft, wherein the first and second rotational shafts are synchronized with each other in rotational speed, the rotational speed of the first rotational shaft is multiplied by a resolution of the second rotation detecting unit to obtain a first multiplication value, the rotational speed of the second rotational shaft is multiplied by a resolution of the first rotation detecting unit to obtain a second multiplication value, a speed error is calculated from a difference between both the first and second multiplication values, and the calculated speed error is added to an instruction value of the rotational speed of the first or second rotational shaft to control the rotation.

* * * * *